United States Patent [19]
Gloge

[11] 3,739,174
[45] June 12, 1973

[54] INTEGRATING ELECTROMAGNETIC BEAM POSITION SENSOR

[75] Inventor: Detlef Christoph Gloge, Red Bank, N.J.

[73] Assignee: Bell Telephone Laboratories, Incorporated, Berkeley Heights, N.J.

[22] Filed: Jan. 4, 1971

[21] Appl. No.: 103,754

[52] U.S. Cl......... 250/201 R, 250/203, 250/220 M, 350/96 WG
[51] Int. Cl............................................... G01j 1/20
[58] Field of Search .................. 250/201, 203, 227, 250/220 M; 356/141, 152; 350/96 WG, 179

[56] References Cited
UNITED STATES PATENTS

| 2,877,284 | 3/1959 | Schultz | 338/19 |
| 3,445,667 | 5/1969 | Dillman | 250/211 |
| 3,588,896 | 1/1971 | Daly | 250/201 |
| 3,579,140 | 5/1971 | Anderson | 250/201 |
| 1,747,664 | 2/1930 | Droitcour | 89/41 |
| 3,494,699 | 2/1970 | Gloge | 350/96 WG |
| 3,316,800 | 5/1967 | Kibler | 250/201 |
| 3,566,127 | 2/1971 | Hafner | 350/96 WG |
| 2,982,859 | 5/1961 | Steinbrecher | 250/203 |
| 3,593,026 | 7/1971 | Uchida | 250/227 |

Primary Examiner—James W. Lawrence
Assistant Examiner—D. C. Nelms
Attorney—W. L. Keefauver and Arthur J. Torsiglieri

[57] ABSTRACT

Quadrant-type spatially-integrating beam position sensors are disclosed that extend across a transverse section of an optical waveguide. These sensors intercept a fraction of the optical beam energy therein either along two orthogonal lines through the optical beam or throughout a cross section of the beam.

4 Claims, 7 Drawing Figures

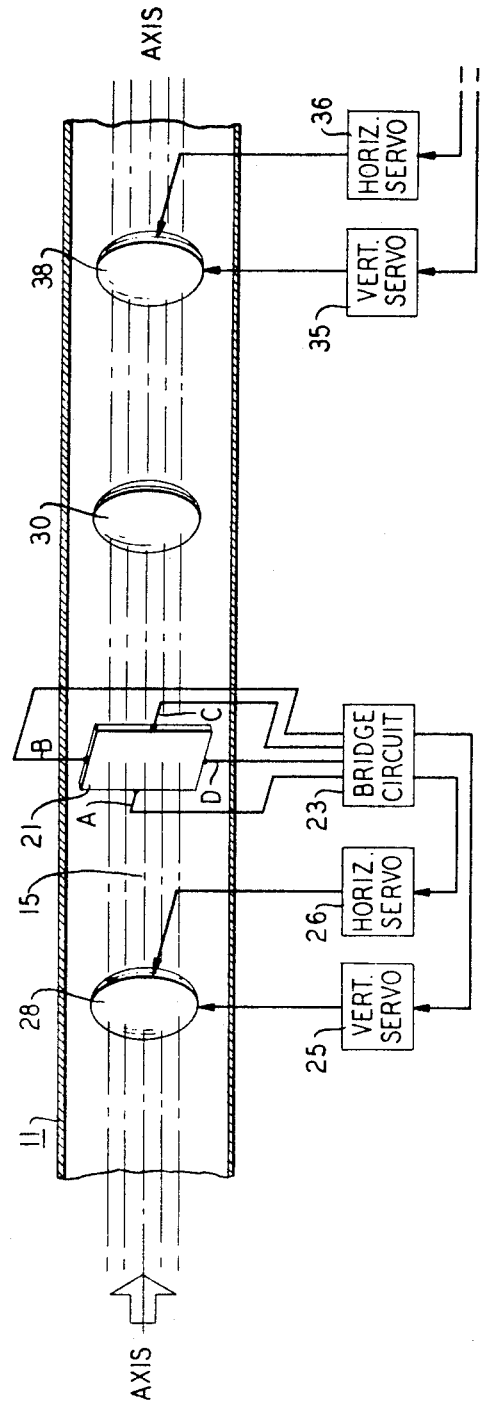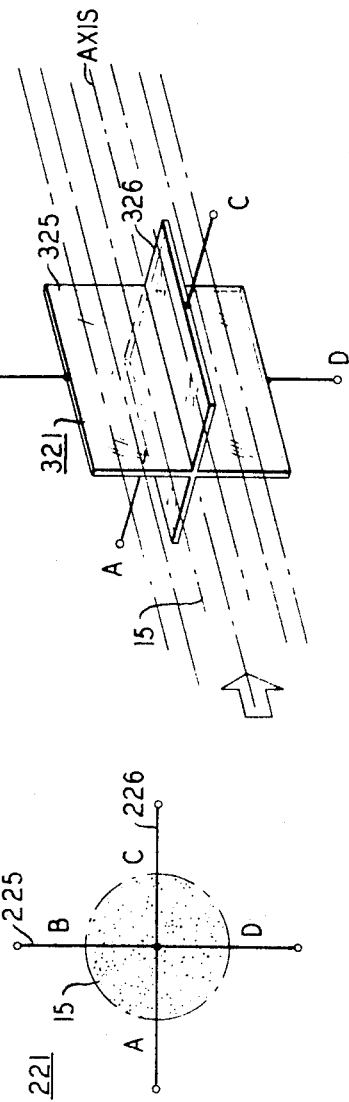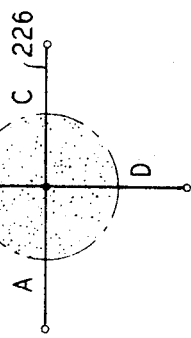

INTEGRATING ELECTROMAGNETIC BEAM POSITION SENSOR

BACKGROUND OF THE INVENTION

This invention relates to electromagnetic beam position sensing arrangements for use in optical waveguiding systems.

Typical wave-guiding systems are disclosed in U.S. Pat. No. 3,442,574 which issued on May 6, 1969 to E. A. J. Marcatili and the copending applications of J. C. Daly, U.S. Pat. No. 3,558,896, P. S. Richter, Ser. No. 756,092, and D. H. Ring, U.S. Pat. No. 3,619,620, all of which were filed Aug. 29, 1968 and are assigned to Bell Telephone Laboratories, Incorporated. In these systems means are provided both for guiding an optical beam through a waveguide and for redirecting the beam as required. The guiding elements typically are a series of lenses, such as glass lenses or gas lenses. By altering the position of the glass lenses or by adjusting the gas lenses, wave-guiding corrections can be introduced into the wave path to compensate for any deviation in the direction of propagation of the optical beam due to misalignments of the waveguide. Information as to the nature of the wave-guiding correction required is provided by optical sensing elements distributed along the wave path. Such sensing devices shown in the above referenced patent and patent applications are devices that intrude slightly into the optical beam and use the intensity at its circumference to gain information about the beam position.

SUMMARY OF THE INVENTION

It is an object of this invention to increase the sensitivity of the sensing elements in guiding optical beams.

This and other objects of the invention are achieved with a symmetrical spatially-integrating beam position sensor that extends across a transverse section of the waveguide. This sensor intercepts a fraction of the optical beam energy either along two orthogonal lines through the optical beam or throughout a cross section of the beam.

In one embodiment of the invention the sensing element is a pair of photoconductive wires, one of which extends vertically through the waveguide and the other of which extends horizontally. These wires are in the same plane, bisect each other at right angles, and are in electrical contact where they cross. The wires are positioned so that the point at which they cross is the center of the desired position of the optical beam; and the sensor is symmetric about this point.

In a second embodiment of the invention, the sensing element is comprised of two photoconductive sheets that bisect each other at right angles. These sheets are arranged so that the line of intersection between the sheets is parallel to the desired direction of propagation of the optical beam.

In a third embodiment of the invention, a transparent photoconductive sheet extends across the waveguide. This sheet is symmetric about the position where the optical beam is desired to be centered; and, in general, it is transverse to the direction of propagation of the beam. Four wires contact this photoconductive sheet at points 90° apart.

The above-described arrangements of photoconductive wires and sheets are such as to form substantially transparent quadrant-type photosensors. When a misaligned optical beam is incident on any one of these photosensors, it falls disproportionately on the different quadrants of the photoconductive wires or sheets. A double bridge circuit then generates from the resulting variations in the output of the photosensors an error signal. This signal is then used to relocate a lens that can adjust the position of the center of the optical beam at the photosensor.

BRIEF DESCRIPTION OF THE DRAWING

These and other objects and features of the invention will appear more fully upon consideration of the various illustrative embodiments now to be described in detail in connection with the accompanying drawings in which:

FIG. 1 depicts an illustrative arrangement of the beam position sensor of this invention in an optical waveguide;

FIG. 2 depicts a schematic illustration of a first embodiment of the invention;

FIG. 3 depicts a schematic illustration of a second embodiment of the invention;

DETAILED DESCRIPTION OF THE DRAWING

Figure 4:
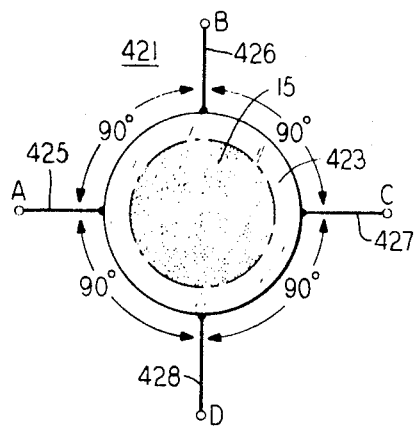
FIG. 4 depicts a schematic illustration of a third embodiment of the invention.

FIG. 1 depicts an optical waveguide 11 in which the position of a beam 15 of electromagnetic radiation is adjusted by detecting its position with a symmetric quadrant-type photosensor 21 and generating from the photosensor signals that are used to correct the position of a beam aligning lens 28 in the waveguide. In FIG. 1, photosensor 21 is shown schematically as a plane transverse to the axis of the optical waveguide and centered on said axis. Four wires contact photosensor 21 at points A, B, C and D. Points A and C are on opposite sides of the waveguide on its horizontal diameter and points B and D are on opposite sides of the waveguide on its vertical diameter. Signals generated in photosensor 21 are conducted by these wires to a double bridge circuit represented schematically as element 23 and discussed in detail below in conjunction with FIG. 7. From this circuit, signals may be generated that drive vertical servo 25 and horizontal servo 26 to adjust the position of lens 28.

In typical apparatus, several such beam aligning units comprising photosensor lens 21 and 28 are used along with many stationary lenses. One such stationary lens 30 and part of a second such aligning unit are shown in FIG. 1 to the right of photosensor 21. While only vertical and horizontal servos 35 and 36 and beam aligning lens 38 are shown in the aligning unit, it will be understood that these elements are connected to a photosensing element and a double bridge circuit similar to elements 21 and 23.

Specific embodiments of photosensor 21 are shown in FIGS. 2 through 6 where they are represented by elements 221, 321, 421, 521 and 621, respectively. Points A, B, C, and D in each of these figures correspond to points A, B, C, and D of FIG. 1.

In the embodiment shown in FIG. 2, photosensor 221 is a pair of crossed photoconductive wires 225 and 226.

These wires bisect each other at right angles, lie in the same plane and are electrically connected at the point where they cross. Preferably, these wires are made of the transparent photoconductor cadmium sulfide, CdS; but any other photoconductor, transparent or not, can be used. Photosensor 221 is symmetric about the point where wires 225 and 226 cross and is positioned in waveguide 11 so that the point where these wires cross is located at the center of the desired position of beam 15. For reference purposes, the cross section of light beam 15 is shown in FIG. 2 centered on this point. This position is, of course, the position for which no error-correcting signal is generated by the double bridge circuit.

A second embodiment of photosensor 21 is shown in FIG. 3. In this case, photosensor 321 is comprised of two photoconductive sheets 325 and 326 that bisect each other at right angles. These sheets are arranged so that the line of intersection between the sheets is parallel to the desired direction of propagation of optical beam 15. As a result, to a beam that is propagating in that direction, these sheets present no more of a cross section to beam 15 than the crossed wires 225 and 226 of FIG. 2. However, because sheets are used instead of wires, the resistance of the photoconductive elements is much less. Again, the photoconductive material that comprises these sheets is preferably a transparent material such as cadmium sulfide; but any photoconductive material, transparent or not, can be used.

Figure 5:
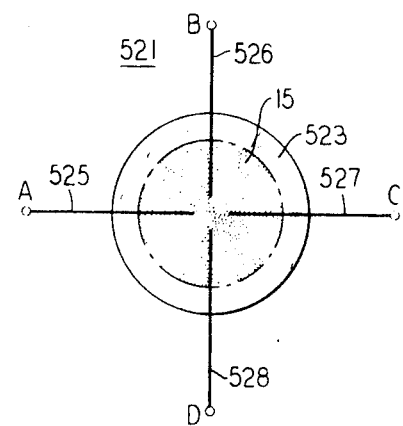
FIG. 5 depicts a schematic illustration of a fourth embodiment of the invention.

A third embodiment of photosensor 21 is shown in FIG. 4. Photosensor 421 comprises a circular sheet 423 of a transparent photoconductor and four thin highly conductive wires 425, 426, 427 and 428 preferably of copper or silver that contact the circumference of sheet 423 at points 90 degrees apart. Photosensor 421 is positioned in waveguide 11 so that the center of sheet 423 is also the center of the desired position of beam 15. For reference, optical beam 15 is shown in FIG. 4 properly aligned with its center coincident with the center of sheet 423. Photosensor 521 shown in FIG. 5 is similar to photosensor 421; and, accordingly, corresponding elements in FIG. 5 have been given the same number incremented by 100. In the embodiment shown in FIG. 5, however, wires 525, 526, 527 and 528 extend across photoconductive sheet 523 equal distances from its circumference. Although the wires may extend far enough that their ends are separated a distance considerably shorter than the diameter of optical beam 15, they are not in electrical contact with each other.

Figure 6:
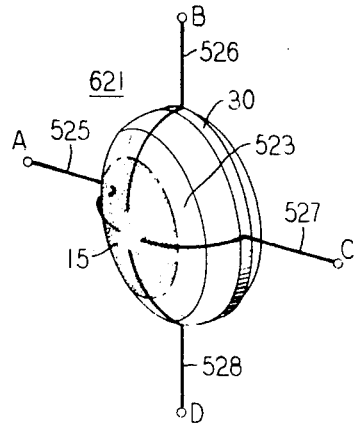
FIG. 6 depicts a schematic illustration of a fifth embodiment of the invention.

Still another embodiment of the photosensor is shown in FIG. 6. In this embodiment, the photosensor of FIG. 5 has been formed on the surface of a lens. Illustratively, this lens would be the next optical element in the waveguide after photosensor 21. Accordingly, in FIG. 6, photosensor 521 is shown located on the surface of lens 30. If this surface is curved, the surface of photoconductive sheet 523 does not lie in a plane. Nevertheless, like photosensors 421 and 521, the sheet is symmetric about its center and the device will operate in the same fashion as the device shown in FIG. 5. Alternatively, photosensors 221 or 421 could be combined with lens 30 to form devices similar to photosensor 621.

Figure 7:
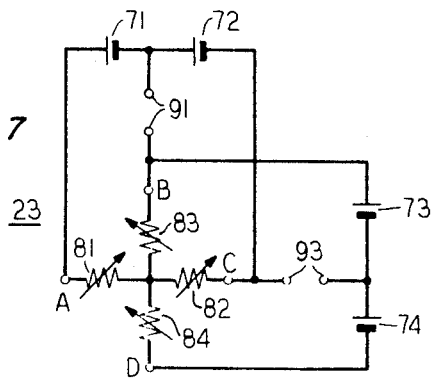
FIG. 7 depicts the double bridge arrangement used to generate error signals.

Double bridge circuit 23 is shown schematically in FIG. 7. The bridge circuit that determines any horizontal misalignment is comprised of two equal voltage sources 71 and 72, the portions 81 and 82 of the photoconductor that extends between terminals A and C, the portion 83 of the photoconductor that extends between terminal B and portions 81 and 82, and two terminals 91 across which is measured a voltage representative of the horizontal misalignment. The bridge circuit that determines any vertical misalignment is similar and comprises two voltage sources 73 and 74, the portions 83 and 84 of the photoconductor that extends between terminals B and D, the portion 82 of the photoconductor that extends between terminal C and portions 83 and 84, and two terminals 93 across which is measured a voltage representative of the vertical misalignment. Voltage sources 71, 72, 73 and 74 typically supply three volts each; but the sensitivity of the photosensor can be increased by using higher voltages.

When a misaligned optical beam is incident on any one of the photosensors disclosed in FIGS. 2 through 6, it falls disproportionately on the quadrants of these photosensors. As a result, signals are generated at either terminals 91 or 93, or both, that indicate the position of the beam. From these signals conventional circuitry may be used to generate two error correcting signals, one of which actuates vertical servo 25 and the other of which actuates horizontal servo 26 to adjust the position of lens 28 so as to correct the misalignment of optical beam 15 in the plane of photosensor 21. Of course, if the optical beam guiding element is a gas lens instead of a glass lens, the error correcting signals are applied to appropriate devices for adjusting the gas lens such as those described in the above-referenced Marcatili patent.

The photoconductive material used in each one of the photosensors shown in FIGS. 2 through 6 is preferably cadmium sulfide. However, other materials such as zinc sulfide and zinc oxide may be used in the visible spectrum and zinc selenide and cadmium selenide may be used in the red and infrared parts of the spectrum. Still other photoconductors may be used in photosensors 221 and 321 where transparency of the photoconductor is not required. The size of the photoconductor depends on the diameter of optical beam 15. If the itensity profile of optical beam 15 is essentially rectangular, the diameter of the photoconductive device should be equal to or greater than that of beam 15. On the other hand, if the intensity profile of beam 15 increases monotonically to the center of the beam and decreases monotonically thereafter, as it does in a Gaussian shaped beam, then the photoconductor should be large enough to collect almost all of the beam.

As will be obvious to those skilled in the art, it is understood that the above-described arrangements are illustrative of just some of the specific embodiments that can represent applications of the principles of the invention. Other arrangements can be devised in accordance with these principles without departing from the spirit and scope of the invention.

What is claimed is:
1. In combination;
   means for guiding a beam of electromagnetic wave energy along a given wavepath;
   a beam position sensor comprising:
      a transparent, photoconductive sheet extending transversely across said wavepath;
      and four contacting wires symmetrically distributed about the circumference of said sheet;
   means responsive to signals generated by said sensor for repositioning said beam within said wavepath;

and means for coupling said wires to said repositioning means.

2. The combination of claim 1 wherein the four wires extend equal distances from the circumference of the photoconductive sheet toward its center but are not in electrical contact with each other.

3. The combination of claim 2 wherein said sheet is located on the surface of a lens.

4. The combination of claim 1 wherein said sheet is located on the surface of a lens.

* * * * *